United States Patent [19]

Payne et al.

[11] Patent Number: 5,519,869

[45] Date of Patent: May 21, 1996

[54] MULTI-DENSITY DATA STORAGE BACKUP ALLOWING BOOTSTRAP IMAGE STORAGE IN DENSITY REQUIRED BY INITIAL BOOT CODE AND OTHER SYSTEM IMAGES AT HIGHER DENSITIES

[75] Inventors: Eric E. Payne, Round Rock; Ruben R. Ramirez, Cedar Park; Johnny M. H. Shieh, Austin, all of Tex.

[73] Assignee: International Business Machines Corporation, Armonk, N.Y.

[21] Appl. No.: 305,499

[22] Filed: Sep. 13, 1994

Related U.S. Application Data

[63] Continuation of Ser. No. 973,511, Nov. 9, 1992.

[51] Int. Cl.$^6$ ............................................. G06F 9/445
[52] U.S. Cl. .................... 395/700; 364/DIG. 1; 364/280; 364/280.2; 364/285; 364/285.1; 364/285.2; 364/285.3; 395/650
[58] Field of Search ........................ 395/650, 700, 395/280–285.3; 364/285, 280, 280.2, 285.3, 285.1, 285.2; 369/50, 51, 59, 60

[56] References Cited

U.S. PATENT DOCUMENTS

| | | | |
|---|---|---|---|
| 3,654,618 | 4/1972 | Kanda et al. | |
| 4,590,557 | 5/1986 | Lillie. | |
| 4,623,963 | 11/1986 | Phillips. | |
| 4,663,707 | 5/1987 | Dawson. | |
| 4,799,145 | 1/1989 | Goss et al. | |
| 4,800,550 | 1/1989 | Yamauchi | 369/59 |
| 4,843,544 | 6/1989 | DuLac et al. | |
| 5,051,745 | 9/1991 | Katz | 341/51 |
| 5,093,915 | 3/1992 | Platteter et al. | |
| 5,101,477 | 3/1992 | Casper et al. | |
| 5,200,864 | 4/1993 | Dunn et al. | 360/48 |
| 5,237,460 | 8/1993 | Miller et al. | 360/8 |
| 5,477,517 | 12/1995 | Gehringer et al. | 369/50 |

FOREIGN PATENT DOCUMENTS

| | | |
|---|---|---|
| 0323890A2 | 7/1989 | European Pat. Off. |
| 0406188A1 | 1/1991 | European Pat. Off. |
| 0461425A2 | 12/1991 | European Pat. Off. |

OTHER PUBLICATIONS

Bianchi, et al.; "Data Compression In A Half–Inch Reel–To–Reel Tape Drive"; Hewlett–Packard Journal; 1989 Jun.

*Primary Examiner*—Alvin E. Oberley
*Assistant Examiner*—Jonathan Hall Backenstose
*Attorney, Agent, or Firm*—Robert M. Carwell

[57] ABSTRACT

An archive command detects an original storage device density value from the device and changes the device's density to a ROM density required by system ROM to read a bootstrap image. The bootstrap image from the system, as well as the original density value stored in a density file, are then written to the storage media in the ROM density required for system restoration by the IPL. The system then reads its copy of the original density value, changes the storage device parameters to their original value, and writes the desired additional system image or other software to the device media in the original device density. When restoration of the thus-archived bootstrap image or other software is required, during system IPL the system ROM will read the bootstrap file from the media stored in the correct ROM density required by the system ROM. When IPL and the bootstrap program have completed booting the system to a minimal state, a restoration program built as part of the bootstrap image then commences restoration. The restoration reads the original device density parameter stored in the media in the density file, changes the storage devices parameter to this value, and proceeds to read into the system the remaining system image or other software on the media, which was stored in the original density, thereby completing restoration.

19 Claims, 3 Drawing Sheets

MULTI-DENSITY DATA STORAGE BACKUP ALLOWING BOOTSTRAP IMAGE STORAGE IN DENSITY REQUIRED BY INITIAL BOOT CODE AND OTHER SYSTEM IMAGES AT HIGHER DENSITIES

This is a continuation of application Ser. No. 07/973,511 filed Nov. 9, 1992.

FIELD OF THE INVENTION

This invention relates to computer system software backups and, more particularly, to such systems and methods wherein the Initial Program Loadable (IPL) control program requires a bootstrap image to be written and read in a fixed format.

BACKGROUND OF THE INVENTION

In modern computer systems it is conventional to provide a central processor unit having a resident on board system (ROS), typically in firmware such as ROM 21 of FIG. 1 which starts the basic machine's boot procedure, and one or more associated non-volatile mass storage devices such as a direct access storage device (DASD).

Due to the possibility of power failures, malfunction of one or more system components which may, for example, give rise to data corruption, and the like, such information systems further typically provide for various forms of system backup procedures. These procedures create and store, on the non-volatile storage such as DASD (10–14, FIG. 1) the necessary files such as the bootstrap image 40 of FIG. 3 which, when read from the DASD and executed as a result of execution of the IPL control programs typically stored in DASD, enables the system to resume a prior state. Initially hardware bootstrap code or ROS in ROM is typically executed to facilitate subsequent reading of the bootstrap image on media. A representative example of such a system providing general background on the problems associated therewith may be seen in U.S. Pat. No. 4,623,963 entitled "Device Independent Data Transfer".

One problem with these systems is that the IPL typically may require that the bootstrap be written and read from the storage device in a fixed format. Because the IPL code may itself be fixed in ROM hardware, such ROS code itself cannot easily and practically be updated to allow for reading the bootstrap image off the media in formats other than the original one provided for in the ROS code stored in ROM. One reason giving rise to data storage media formats in which the bootstrap IPL code is stored differing from that required by the ROS is technology improvements in the data storage media.

A serious consequence of the foregoing results when the stored bootstrap IPL code on media must be in a format compatible with the ROS code in ROM. Other software, such as system files, catalogs, applications, and data, as well as future bootstrap images are thereby forced to remain at the fixed format dictated by the ROS format. The aforementioned technology improvements in the storage media cannot therefore be utilized, as the media will be required to use the lower capacity format dictated by the ROM.

An example will serve to illustrate the problem. In a typical current system backup program, the mass storage device may be implemented in the form of a tape drive configured to 512 bytes-per-block during creation of the system backup. This requirement, in turn, was dictated by the fact that the ROS of the computer system was written to interface to devices in the 512 bytes-per-block format. Obviously if the tape was written in any format other than the 512 bytes-per-block format, then, the ROS could not understand the data held in the tape such as the IPL bootstrap image necessary to fully bring the system up.

Such tape drives typically store data on 8 millimeter tape which may hold two million blocks, each such block in turn being capable of holding a total of 1,024 bytes of data. Thus, a typical tape may have a maximum capacity of greater than two gigabytes of data storage. However, because the ROS requires a format having a capacity of half that of the tape drive, e.g. it requires that the software to generate the IPL stored on media be written in the 512 bytes per block format, it stands to reason that only half of each tape block is written to with real data, with the rest of each block being left blank.

This graphically illustrates one of the serious problems associated with present systems. The system backup program can accordingly write one gigabyte of data per eight millimeter tape notwithstanding that the tape and tape drive have a capacity of two gigabytes of data storage. This results in great inefficiencies in terms of time and money. Specifically, the time taken to create the system backup is effectively doubled. Moreover, the cost of extra tapes adds to the user's maintenance cost. Notwithstanding this, it is nevertheless too expensive and impractical to change ROS chips in the field to allow larger bytes-per-block densities to be written to and read from the storage technology (in this case a tape drive) which continues to exhibit extremely significant rapid continual advances in densities and formats.

One approach currently used in an effort to solve the problem is to provide for two separate media. The bootstrap image is held on one media which is utilized to boot the computer system. Once the system is up and running, yet another piece of storage media is substituted. The computer operator changes the configuration of the storage device so that the storage media is used in an improved storage mode for software other than the bootstrap image necessary to enable the system to get up and running. Once the operator has thus changed the storage device configuration, the balance of the software is read by the system and restored in that new mode.

Such an approach has at least two major drawbacks. The most obvious is that two pieces of storage media are required for every data store. Moreover, the user must be aware of what value the device must be changed to in order to read the secondary storage media.

Yet a second attempt to solve the problem was to have the bootstrap image and the other software to be delivered to the system residing on the same media but written in different modes, e.g. the bootstrap image would be in the mode required by the firmware whereas the balance of the software would be in a different and presumably higher capacity format. After the IPL control reads in the bootstrap image to the computer system, the system would thereafter halt and wait for operator intervention. The operator must then change the device parameters to match the software, manipulate the storage media so that it was ready to restore its information, and thence issue the restoration command.

Again there are serious drawbacks with this approach. First, the user must be aware of the new value for the device. Still further, the user must also have enough knowledge of the system to position the storage media so that the correct record is read.

Yet another approach was attempted in the art to solve the foregoing problems. In this third method, both the bootstrap image and the main software to be delivered were stored on the same media and written in the same mode. After the IPL code brought the system up, the restoration automatically would position the storage media to the record containing the software to be delivered. Then, that image would be restored onto the machine with no changes in the devices mode. However, because the ROS dictated the mode as previously described, storage of the main storage beyond the bootstrap image was obviously limited to the lower density format dictated by the ROS mode.

From the foregoing, it will be appreciated as storage devices improve, it was highly desired that the concomitant amount of data archived to media could be improved without the need to change the ROM hardware.

It was yet another object of the invention to provide for system backup wherein the need for operator intervention in controlling device attributes was obviated.

Still another object of the invention was to enable the system operator to avoid having to know what values the software itself required for restoration.

Still another object of the invention was to permit the operator, at the time the backup and other software images were created on the storage media, to control the density with which the image was written to the media.

Still a further object of the invention was to significantly reduce the time required in archiving and restoring the system as higher storage densities became available and used for the software image.

These and other objects are provided by the invention which may be understood in greater detail with reference to the figures wherein:

SUMMARY OF THE INVENTION

An archive command detects an original storage device density value from the device and changes the device's density from this original value to a density required by the ROS stored in system ROM to read a bootstrap image. The bootstrap image from the system, as well as the original density value stored in a density file, are then written to the storage media in the density required by the ROS and ROM for system completed restoration by the IPL. The system then reads its copy of the original density value, changes the storage device parameters back to their original value, and writes the desired additional system image or other software to the device media in the original device density. When restoration of the thus-archived bootstrap image or other software is required, during system IPL the ROS on system ROM will read the bootstrap image file from the media stored in the correct density required by the ROS and system ROM. When IPL and the bootstrap program have completed booting the system to a minimal state, a restoration program built as part of the bootstrap image then commences restoration. The restoration reads the original device density parameter stored in the media in the density file, changes the storage device's parameter to this value, and proceeds to read into the system the remaining system image or other software on the media, which was stored in the original density, thereby completing restoration.

DETAILED DESCRIPTION OF THE PREFERRED EMBODIMENT

Figure 1:
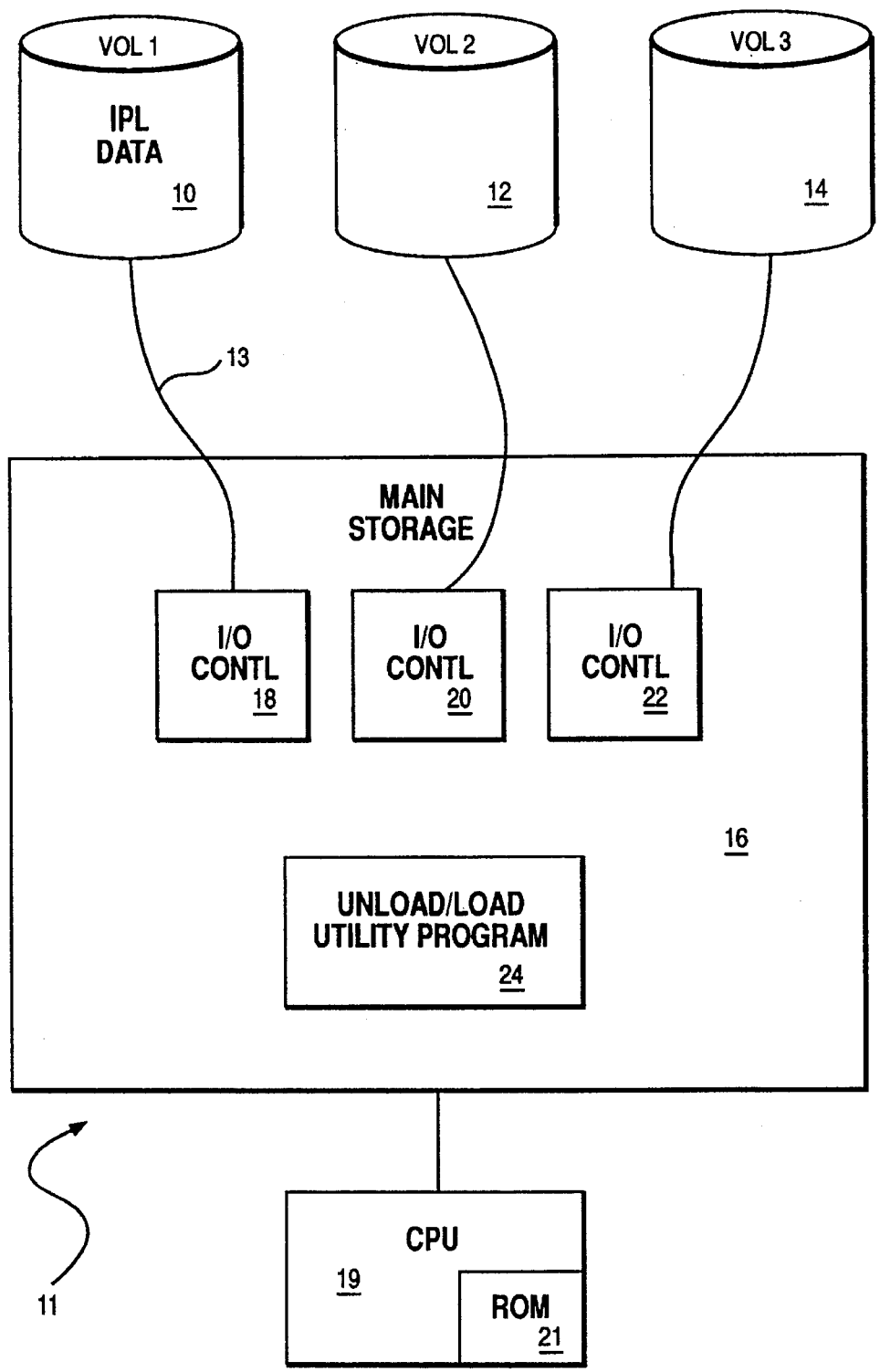
FIG. 1 is a block diagram illustrating a typical computer system employing the invention.

In FIG. 1 a simplified illustration of a computer system employing the systems and methods of the subject invention is depicted which includes a plurality of DASD volumes 10–14, main storage 16, and a central processing unit (CPU) 19. Additional details regarding this system may be found in U.S. Pat. No. 4,623,963 which is incorporated herein by reference.

FIG. 1 illustrates the relation of a plurality of such DASD volumes 10–14 to the computer main storage 16. Although three DASD volumes are shown for purposes of illustration, it will be readily apparent that depending upon the particular system configuration more or less could be provided. Moreover, it will further be understood that the volume shown could take several forms, including magnetic disk media, magnetic cylinder media, optical disk media, or similar direct access storage media. The first volume 10, denoted as volume 1, contains initial program load (IPL) code necessary for complete booting of the system 11. Data collections are distributed between this volume and the second and third volumes 12 and 14 denoted as volumes 2 and 3 respectively. In addition to the IPL data and code contained in volume 10 comprising the system initialization program and data, additional data and program collection may be distributed between this volume 1 and the second and third volumes 2 and 3 as is well known in the art. Such additional information includes other system and user data, including system catalogs for locating such additional software and the like, obviously comprising the backup system image as well as any additional software desired to be archived and which provides the essential function of providing program and data necessary to complete booting the system 11 to a minimal state during restoration.

The computer main storage 16 contains I/O control blocks 18, 20, and 22 for each respective DASD volume 1–3. Additionally, unload or load utility programs are also loaded into the computer main storage 16 as indicated at 24. These program are typically contained within a single executable program module in the system program libraries. The simplified illustration of the computer system 11 of FIG. 1 further includes a central processing unit 19 as well as read only memory (ROM) 21, comprising resident on-board system (ROS) which facilitates the basic machine boot procedure.

Figure 2:
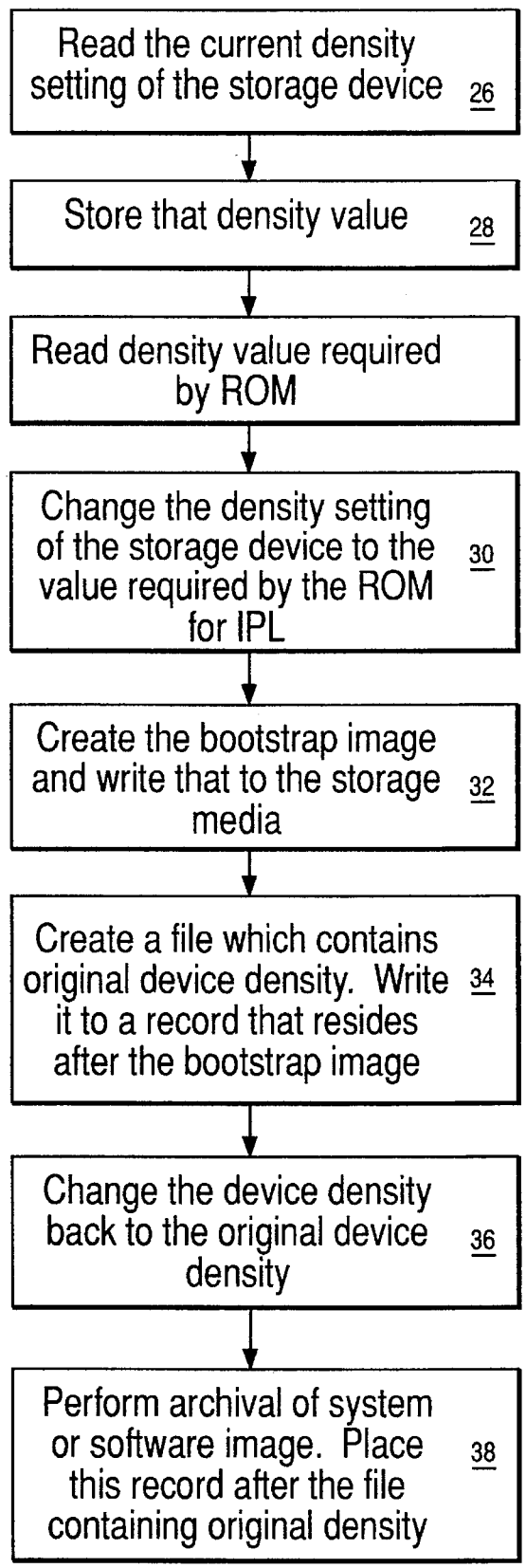
FIG. 2 is a flow diagram illustrating creation of the system software image including the bootstrap image utilized by the IPL control program.

Turning now to FIG. 2, a flow diagram is provided illustrating the function of the bootstrap code contained on the media indicated at reference numeral 40 of FIG. 3 which serves the function of placing the system 11 in a condition whereby it may be subsequently restored. First, in response to the archiving program being executed by the system 11 during archiving, the current density setting of the storage device such as DASD 10 is read by the CPU through the corresponding I/O controller 18 and bus 13 interconnecting the storage device 10 and the main storage 16. This step is shown at reference numeral 26 of FIG. 2. This density value, such as 1024 bytes-per-block will then be stored as IPL data in volume 1 of the storage device, shown as step 28 in FIG. 2. The system 11 will then read from storage 10 the density setting or value required by the ROM 21 for IPL, step 29 of FIG. 2. CPU 19 will then execute a command transmitted through the I/O controller 18 and bus 13 to the volume 1, thereby changing the density setting of the storage device 10 to this value just retrieved by the CPU 19 which is required by the ROS in ROM 21 for such IPL, shown as step 30.

Still continuing with FIG. 2, CPU 19, under such archive command and program control, will then create a bootstrap image and write it to the DASD 10, step 32. The CPU 19 will also then create a file containing the original storage device 10 density, referred to hereinafter as a density file and will then write this file to a record in volume 1 of DASD 10, step 34.

The CPU 19, continuing to be under control of the IPL program retrieved from DASD 10, will then cause the system 11 to operate to switch the density of the storage device represented by the volume 1 DASD 10 back to its original device density, again through means of the I/O controller 18 and bus 13, shown as step 36.

Finally, archiving of the system or software image will take place under control of the CPU 19 whereby any desired additional software images will be stored through the I/O link 13 on the volume 1 DASD 10 in the original density read at step 26 in accordance with step 38.

Figure 3:
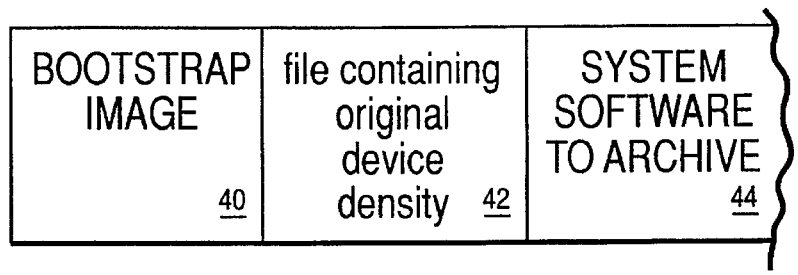
FIG. 3 is a schematic illustration depicting the information written to the storage medium, and, more particularly, a preferred implementation illustrating the order of storage on the media of the bootstrap image, density setting file, and software to be archived.

FIG. 3 is an illustrative pictorial example of the order in which the bootstrap image, density setting file, and software to be archived would be stored on the storage medium such as DASD 10, after the completion of the archiving process just described with reference to FIG. 2. More particularly, in a preferred embodiment the bootstrap image 40 of FIG. 3 would first be written to the DASD 10 as shown in FIG. 3. This would in turn be followed by storage of the file 42 on DASD 10 which contains the original device density setting retrieved at step 26. It will be recalled that this original device density setting of the storage devices 10-14 would reside in a file created at step 34 and written during that step 34 out to DASD 10.

Finally, still referring to FIG. 3, any system software desired to be archived, 44, would then be placed on the DASD 10 per step 38 of FIG. 2. It will be appreciated that the representation of FIG. 3 is only intended to be illustrative of the logical order in which the various data 40, 42, 44, may be stored onto and read from the DASD 10. In other words, physically the data 40-44 may appear in an order different from that shown in FIG. 3 on the DASD 10 but may be sequentially retrieved logically in the order depicted by FIG. 3. In other words, in storing the necessary information for restoring the system 11, the bootstrap image 40 would first be created and stored followed by the file containing the original device density 42 and the system software to archive 44 although this is not essential. Once the DASD 10 has stored the bootstrap image 40 in the device density required by the ROS and ROM, it will be recalled that the device density will then be changed back to its original density step 36, whereupon either the system software to archive, 44 may be stored on DASD 10 followed by the file containing the original device density 42 or conversely. In other words, the temporal order of storing of this data 42, 44 is not crucial. As will become more apparent with reference to FIG. 4, however, once the bootstrap image 40 is read from DASD 10, although physically on the tape the data 44 may precede the data 42, this file containing the original device density 42 must thence be read from the DASD 10 in order to set the storage 10 to its original device density before the system software 44 to restore to the system 11 is read from DASD 10 and reinstalled in the system 11.

Figure 4:
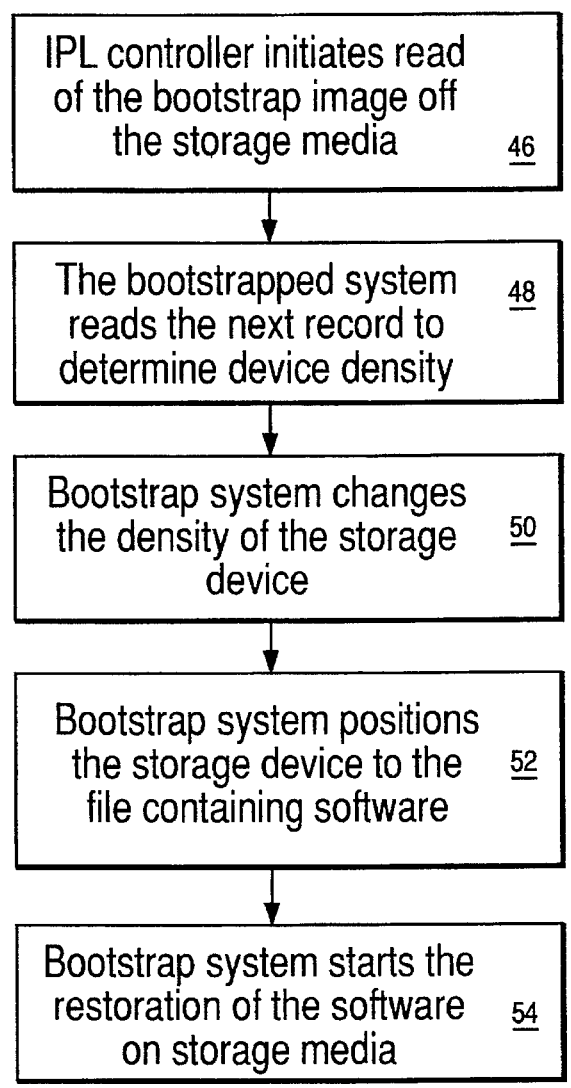
FIG. 4 is a flow diagram depicting the steps wherein a computer system is booted utilizing the boot image stored on the storage medium in accordance with the invention and the IPL controller, illustrating usage of the density setting file in providing dynamic change to the storage device's parameters.

Referring now to FIG. 4 in more detail, once the appropriate data schematically represented in FIG. 3 has been generated and stored on the DASD 10, at some point in time thereafter it may be desired to reboot the system 11 and bring it back into a state defined by the data stored in accordance with the discussion accompanying FIG. 3. FIG. 4 depicts a simplified flow diagram indicating the order of steps implemented by the system 11 under initial control of the restoring ROS program on ROM 21 to restore the system 11 to a desired state. The CPU 19 will execute this restoring program to implement the steps of FIG. 4 in the following manner. First, this restoring ROS code will cause the IPL controller to initiate a read of the bootstrap image 40 of FIG. 3 off of the storage media such as DASD 10. This bootstrap image, once it has been thereby read into the main storage 16 according to step 46 may then be executed to complete boot of the system 11 whereupon step 48 is then caused to be executed in FIG. 4. In other words after the IPL controller has read the bootstrap image 40 off of the DASD 10 and the system 11 has thus executed the code of the bootstrap image 40, the system 11 is thus booted and under control of the restoring program. This will cause the system 11 to read the next logically sequential record on the DASD 10, namely the file 42 containing the original device density of the DASD 10, shown as step 48 of FIG. 4. The system 11, having thus obtained this original device density data 42, will utilize this information in accordance with execution of the IPL code to cause the bootstrap system 11 recently booted to execute commands through the I/O controller 18 and I/O bus 13 to change the density of the storage device 10 back to its original density in which the additional archived software is stored on the DASD 10. This step is illustrated as step 50 in FIG. 4.

Once the storage device 10 has been reinitialized to operate in accordance with its original density per step 50, the bootstrap system 11, in response to execution of the further steps of the IPL code will cause positioning of the storage device 10 at the appropriate logical location containing the additional archived software shown as system software 44 of FIG. 3. This step may be seen illustrated as step 52 in FIG. 4. Finally, under control of the restoring program, the bootstrap system 11 will then issue commands through the I/O controller 18 and I/O link 13 to cause the loading of the balance of the software on DASD 10 to the main storage 16 to complete the restoration shown as step 54 of FIG. 4. Because of the change of density in the storage device 10 caused by step 50, it will be noted that this downloading of the remaining software image on DASD 10 per step 54 will be at the correct density that such software was stored at initially.

Now that the overall operation has been described, in a brief summary a key feature of the invention is to change a portion of the command causing system backup so that a small section of the system backup is written, for example, in a bytes-per-block format dictated by the ROS and ROM while the rest of the system to be archived may be archived in another format designated by the user. This designation in turn originates from the command to make a system backup, causing the reading of the particular configuration, e.g. density parameters of the tape drive or other storage at the time the command to make a system backup is started.

From such configuration or parameters, the system backup command has determined what different density the user desires to employ to archive the remaining majority of the system. Consequently, the system backup program will set the tape drive or other storage device to a number of bytes per block format during the beginning of the backup required by the ROS and ROM and will stop outputting the boot code to tape or other storage once the minimum operating system necessary to boot the system has been transferred to such storage.

At this time, the system backup program then executes commands causing the switching over of the storage device to the next block size which the user has requested which, for example, may now be 1,024 bytes of data rather than a representative 512 bytes-per-block format utilized in some systems for initial basic machine boot procedures. Also in response to this system backup program, the system will then continue archiving the rest of the data in the new denser format.

When the system is unpacking itself in response to the ROS from the storage device 10 during the restoration procedure, the system backup program will change the block size of the 8 millimeter or other tape drive being utilized to the user-specified bytes-per-block format which was encountered during the making of the backup tape. After this change takes effect, the remaining system data archived on the storage device 10 is unpacked by the system backup program in the new denser data density format of 1,024 bytes of data for example. It will be noted that this system and method will also work if the user simply chooses to leave the storage device such as the tape drive in the original mode required for basic machine boot precedures such as the 512 bytes per block mode.

It will be appreciated from the foregoing that the systems and methods provided by the invention solve the problem of how to increase the amount of data which may be archived onto a tape. It will further be appreciated that this improvement over prior systems may be implemented easily without incurring costs associated with hardware changes to the ROS/ROM. Moreover, the invention allows for quicker and cheaper methods of creating a system backup for the system, and finally will allow for flexibility in the system backup procedure and command to remain compatible with the arrival of tape systems capable of higher density storage.

Whereas in the embodiment just described, a density file has been included which includes the data defining the density at which the user desires the storage device to operate, inclusion of such a density file is not necessarily required in an alternate embodiment. In such an embodiment, the system image or software could still be written to the media of the storage device in the device's original density, however no density file would be included onto the media. Instead during the restoration of the image wherein the boot code and other software resident on the storage device is read off the drive and into the system, the restoration program could be implemented so as to attempt reading of the main body of the archived software beyond the system boot code at numerous different common density settings, e.g. the data storage device could essentially be interrogated in a seek routine to discover an appropriate density setting for retrieving the rest of the software from the storage device. The system would thus attempt different density settings until it received a successful read and restore or, in the alternative, for example, until a preselected number of density choices were exhausted.

While the invention has been shown and described with reference to particular embodiments thereof, it will be understood by those skilled in the art that the foregoing and other changes in form and detail may be made therein without departing from the spirit and scope of the invention.

We claim:

1. A computer-implemented method for use in storing data on a recording medium used in a multiple format storage device of a computer system including a subsystem for initializing said computer system to an initial state by execution of a boot image, comprising:

storing in a first data format of said storage device a preselected first density value for use in reading said boot image;

storing in said first data format of said storage device a first image comprised of a boot image on said recording medium corresponding to said first density value;

storing in said first data format of said storage device a preselected second density value for use in reading a second image of archived system operating software stored on said recording medium; and storing said second image on said recording medium in said second data format of the said storage device, said second data format and said second density being independent of the size of said second image.

2. The method of claim 1 including detecting said stored first density value; and changing the mode of said multiple format storage device to store data in said first data format in response to said detecting said stored first density value and prior to said storing said first image.

3. The method of claim 2 wherein said storing of said first image is after said changing said mode to store data in said first data format.

4. The method of claim 2 including detecting said stored second density value; and changing the mode of said multiple format storage device to store data in said second data format in response to said detecting said stored second density value and prior to said storing said second image.

5. The method of claim 3 wherein said storing said second image is after said changing said mode to store data in said second data format.

6. The method of claim 1 wherein said first data format is identical to said second data format.

7. A computer-implemented method for restoring computer system operation with a bootstrap image of executable code stored in a preselected discrete first data format having a corresponding preselected discrete stored first density value, and further with an archival image of executable operating system software code stored in a preselected discrete second data format having a corresponding preselected stored second density value, wherein said bootstrap image and said archival image and said second density value are stored on a recording medium readable by a multiple format storage device, comprising the steps of:

storing said second density value in said first data format on said recording medium;

reading said first density value for use in reading said bootstrap image;

reading said bootstrap image from said recording medium on said storage device in said first data format in response to said reading said first density value;

executing said bootstrap image with said computer system to restore initial operation of said computer system;

reading said stored second density value in said first data format from said recording medium on said storage device for use in reading said archival image;

switching the format of said storage device to read said recording medium on said storage device in said second format in response to said reading of said second density value;

reading said archival image from said recording medium on said storage device in said second data format; and executing said archival image to restore said computer system operation in response to said reading said archival image; and wherein said second density value and said second data format are independent of the size of said archival image.

8. The method of claim 7 wherein said computer system includes non-volatile read-only memory storing said first density value, and wherein said method further includes reading said first density value from said read only memory before said reading of said bootstrap image.

9. The method of claim 8 including switching the format of said storage device to read said recording medium on said storage device in said first data format in response to said reading said first density value.

10. The method of claim 9 wherein said reading said bootstrap image from said recording medium is after said switching of said format of said storage device to read said recording medium in said first data format.

11. A system for backing up information in a computer system having a boot image for initially booting said system and a second image of archived operating system software for completing said booting of said system, comprising:

first means for storing in a first non-volatile storage and in a first data format of said storage device a preselected discrete first density value corresponding to said boot image for use in reading said boot image; and second means interconnected to said first means for storing, in a second non-volatile storage, (a) said boot image, (b) a preselected discrete second density value for use in reading said second image of archived operating system software corresponding to a data format of said second image, and (c) said second image, said boot image and said second density value being stored in said first data format corresponding to said first density value, and said second image being stored in a second data format corresponding to said second density value; and wherein said second density value and said second data format are independent of said second image.

12. The system of claim 11 wherein said first non-volatile storage is a read-only memory, and said read-only memory contains stored resident on board system code.

13. The system of claim 11 wherein said second non-volatile storage comprises a multi-format tape drive and a recording medium responsive to said tape drive.

14. The system of claim 13 wherein said boot image, said second density value, and said second image are stored in said recording medium.

15. The system of claim 14 wherein said first and said second data formats are identical.

16. The system of claim 15 further including means interconnected to said multi-format tape drive for switching said tape drive to said first and said second data format.

17. The system of claim 16 wherein said means for switching includes means for switching said tape drive to said first data format to read said boot image from said recording medium; and means for switching said tape drive to said second data format to read said second image from said recording medium.

18. The system of claim 17 further including means interconnected to said tape drive for reading said second density value from said recording medium.

19. A computer-implemented method for use in restoring data on a recording medium used in a multiple format storage device of a computer system including a subsystem for initializing said computer system to an initial state by execution of a boot image having a preselected density value, comprising:

reading a current density setting of said storage device;

storing said current density setting as an original device density;

reading a density value required by said subsystem;

altering said original device density of said storage device to said density value required by said subsystem;

creating said boot image;

writing said boot image to said recording medium on said storage device;

writing said original device density to said recording medium on said storage device;

changing said density value back to said original device density:

executing an archive of said computer system; and storing data corresponding to said archive in said recording medium of said storage device.

* * * * *